(12) United States Patent
Sawa

(10) Patent No.: US 10,298,806 B2
(45) Date of Patent: May 21, 2019

(54) IMAGE PROCESSING APPARATUS AND PROCESSING METHOD FOR COMBINING MULTIPLE IMAGES WITH ACCURACY VERIFICATION THEREOF

(71) Applicant: KYOCERA Document Solutions Inc., Osaka-shi, Osaka (JP)

(72) Inventor: Naoki Sawa, Osaka (JP)

(73) Assignee: KYOCERA DOCUMENT SOLUTIONS INC., Osaka-Shi, Osaka (JP)

(*) Notice: Subject to any disclaimer, the term of this patent is extended or adjusted under 35 U.S.C. 154(b) by 46 days.

(21) Appl. No.: 15/790,104

(22) Filed: Oct. 23, 2017

(65) Prior Publication Data

US 2018/0124276 A1    May 3, 2018

(30) Foreign Application Priority Data

Oct. 28, 2016   (JP) ................................. 2016-211163

(51) Int. Cl.
*H04N 1/38*   (2006.01)
*H04N 1/387*   (2006.01)
*H04N 1/10*   (2006.01)
*H04N 1/00*   (2006.01)
*G06T 3/40*   (2006.01)

(52) U.S. Cl.
CPC .......... *H04N 1/3876* (2013.01); *G06T 3/403* (2013.01); *H04N 1/00729* (2013.01); *H04N 1/00748* (2013.01); *H04N 1/1013* (2013.01); *H04N 1/3873* (2013.01)

(58) Field of Classification Search
CPC combination set(s) only.
See application file for complete search history.

(56) References Cited

U.S. PATENT DOCUMENTS

2017/0038576 A1*   2/2017   Sasaki .................. G02B 21/367

FOREIGN PATENT DOCUMENTS

JP        2010-245885 A    10/2010

* cited by examiner

*Primary Examiner* — Barbara D Reinier
(74) *Attorney, Agent, or Firm* — Viering, Jentschura & Partner mbB

(57) ABSTRACT

This image processing apparatus includes a first determination section, a first control section, a second determination section, and a second control section. If the first determination section determines that there are images whose outer shapes are not rectangular, the first control section performs control operations to connect edges of the images to combine the images. The second determination section determines whether the outer shape of the combined image, which is made of the images combined by the first control section, is rectangular or whether the combined image is bilaterally symmetric with respect to a predetermined line passing through the center of the combined image. If the second determination section determines that the outer shape of the combined image is rectangular or that the combined image is bilaterally symmetric, the second control unit performs control operations to produce a composite image of the images with the edges connected to each other.

11 Claims, 5 Drawing Sheets

IMAGE PROCESSING APPARATUS AND PROCESSING METHOD FOR COMBINING MULTIPLE IMAGES WITH ACCURACY VERIFICATION THEREOF

CROSS REFERENCE TO RELATED APPLICATIONS

This application claims priority to Japanese Patent Application No. 2016-211163, which was filed on Oct. 28, 2016, and is incorporated herein by reference in its entirety.

BACKGROUND

The present disclosure relates to an image processing apparatus and an image processing method.

Some of known image processing apparatuses read images on pieces of a torn document to obtain a plurality of image data sets and connect the image data sets to output a composite image data set of the document.

There are conventionally known techniques of connecting image data sets of pieces of a document and outputting a composite image of the document.

A typical image processing apparatus is characterized by including an image data inputting unit that reads images on a plurality of document pieces to input image data sets of the document pieces, a feature value extracting unit that extracts a feature value representing the shape of the individual document pieces from the corresponding input document data sets, a calculation unit that calculates a positioning parameter to be used to position the image data sets based on the extracted feature values, and an image-compositing and outputting unit that composites the image data sets based on the calculated positioning parameter and outputs the composite image data set.

SUMMARY

In one aspect of the present disclosure, an image processing apparatus includes a capturing unit, a storage unit, a first determination section, a first control section, a second determination section, and a second control section. The capturing unit captures images of a plurality of documents. The storage unit stores the images of the documents captured by the capturing unit. The first determination section determines whether there are a plurality of images whose outer shapes are not rectangular in the images of the documents stored in the storage unit. If the first determination section determines there are images whose outer shapes are not rectangular, the first control section performs control operations to connect edges of the non-rectangular images to combine the non-rectangular images. The second determination section determines whether the outer shape of the combined image, which is made up of the non-rectangular images combined by the first control section, is rectangular or whether the combined image is bilaterally symmetric with respect to a predetermined line passing through the center of the combined image. If the second determination section determines that the outer shape of the combined image is rectangular or that the combined image is bilaterally symmetric, the second control unit performs control operations to produce a composite image of the non-rectangular images with the edges connected to each other.

In another aspect of the present disclosure, an image processing method includes a capturing step, a storing step, a first determining step, a first controlling step, a second determining step, and a second controlling step. The capturing step is to capture images of a plurality of documents. The storing step is to store the captured images of the documents. The first determining step is to determine whether there are a plurality of images whose outer shapes are not rectangular in the stored images of the documents. The first controlling step is, if it is determined that there are images whose outer shapes are not rectangular, to perform control operations to connect edges of the non-rectangular images to combine the non-rectangular images. The second determining step is to determine whether the outer shape of the combined image, which is made up of the non-rectangular images combined by the first control section, is rectangular or whether the combined image is bilaterally symmetric with respect to a predetermined line passing through the center of the combined image. The second controlling step is, if it is determined that the outer shape of the combined image is rectangular or that the combined image is bilaterally symmetric, to perform control operations to produce a composite image of the non-rectangular images with the edges connected to each other.

DETAILED DESCRIPTION

Figure 1:
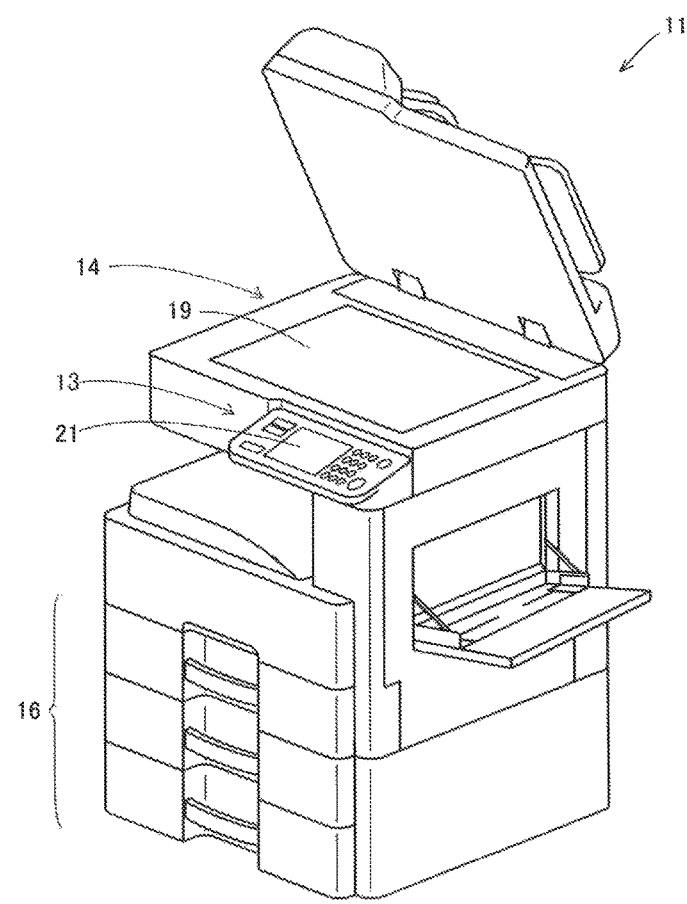
FIG. 1 is a schematic external view of a multifunction peripheral to which an image processing apparatus according to an embodiment of the present disclosure is applied.
Figure 2:
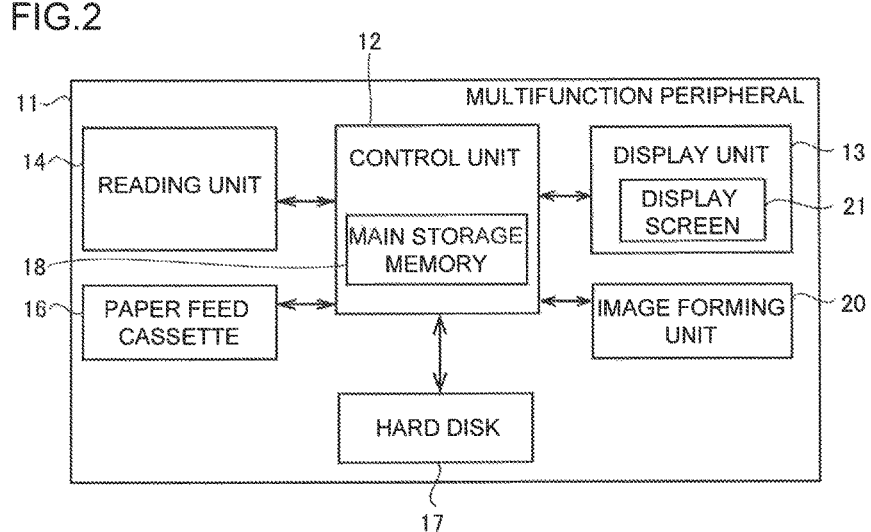
FIG. 2 is a block diagram showing the configuration of the multifunction peripheral shown in FIG. 1.

An embodiment of the present disclosure will be described below. FIG. 1 is a schematic external view of a multifunction peripheral 11 to which an image processing apparatus according to the embodiment of the present disclosure is applied. FIG. 2 is a block diagram showing the configuration of the multifunction peripheral 11 shown in FIG. 1.

In FIGS. 1 and 2, the multifunction peripheral 11 includes a control unit 12, a display unit 13, a reading unit 14 serving as a capturing unit that captures images of documents, a hard disk 17 serving as a storage unit, and an image forming unit 20.

The control unit 12 controls the entire multifunction peripheral 11. The control unit 12 is made up of a CPU and some other components, and includes a main storage memory 18 that temporarily stores data. The display unit 13 includes a touch panel type display screen 21. The reading unit 14 captures images of documents by reading the documents placed on a document stage 19. The image forming unit 20 forms an image on paper transported from one of the paper feed cassettes 16 based on the images of the documents captured by the reading unit 14, and outputs the formed image. The hard disk 17 stores the read images and output images.

Figure 3:
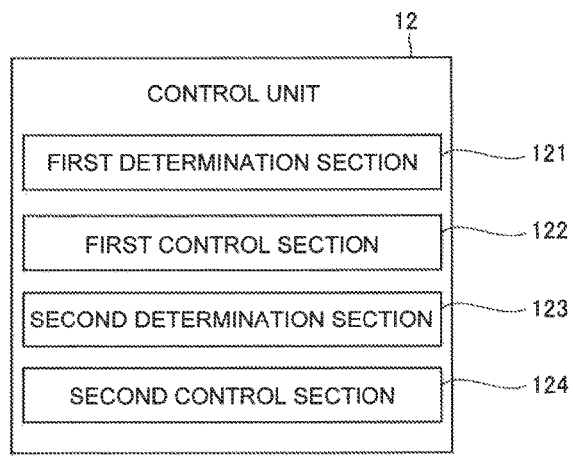
FIG. 3 is a block diagram showing the configuration of a control unit.

Next, the configuration of the control unit 12 provided in the multifunction peripheral 11 will be described. FIG. 3 is a block diagram showing the configuration of the control unit 12. Referring to FIG. 3, the control unit 12 includes a first determination section 121, a first control section 122, a second determination section 123, and a second control section 124.

The first determination section 121 determines whether there are a plurality of images whose outer shapes are not rectangular in the images of the documents stored in the storage unit. If the first determination section 121 determines that there are images whose outer shapes are not rectangular, the first control section 122 performs control operations to connect edges of the non-rectangular images to each other to combine the non-rectangular images. The second determination section 123 determines whether the outer shape of the combined image, which is made up of the non-rectangular images combined by the first control section 122, is rectangular, or whether the combined image is bilaterally symmetric with respect to a predetermined line passing through the center of the combined image. If the second determination section 123 determines that the outer shape of the combined image is rectangular or that the combined image is bilaterally symmetric, the second control section 124 performs control operations to produce a composite image of the non-rectangular images with the edges connected to each other.

Figure 4:
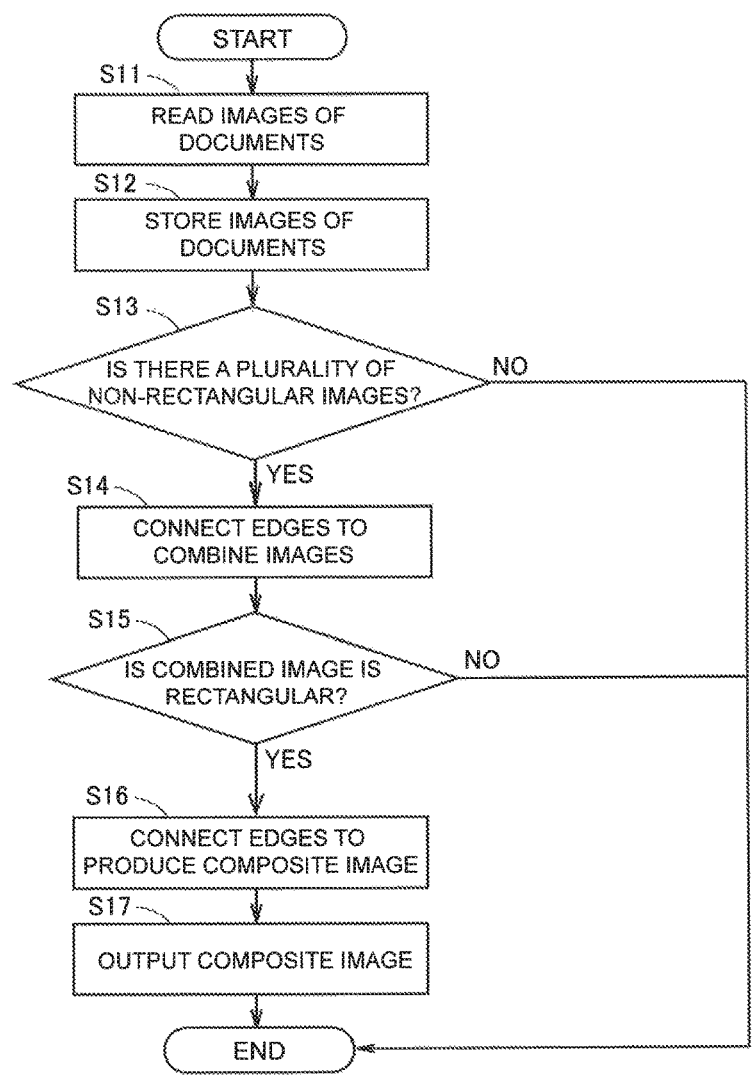
FIG. 4 is a flowchart of processing steps for reading images of a torn document to form a composite image.

Next, it will be described how to read images on pieces of a torn document and form a composite image by using the multifunction peripheral 11. FIG. 4 is a flowchart of processing steps for reading images of a torn document to form a composite image. In this description, two pieces of a torn document are connected to each other to form a composite image.

Referring to FIG. 4, first, a user places two pieces of a torn document on a document stage 19. Upon detecting the placement of the document, the reading unit 14 captures the images on the pieces of the document (step S11 in FIG. 4, hereinafter "step" is omitted).

Figure 5:
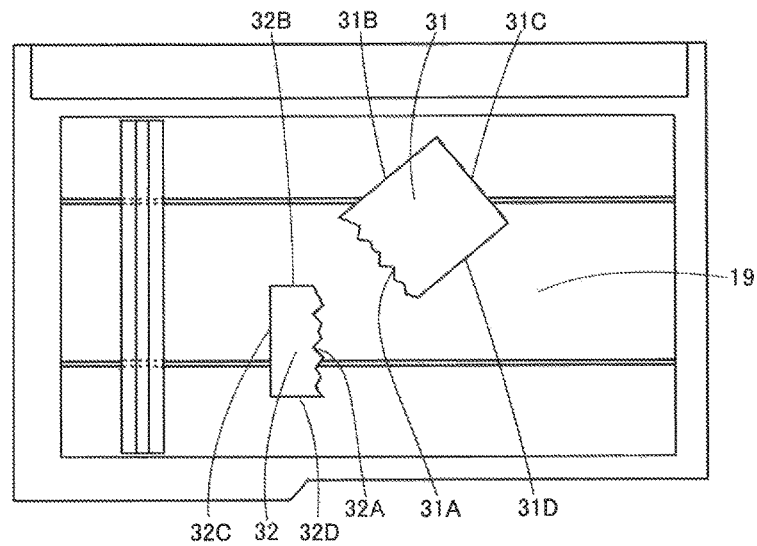
FIG. 5 illustrates an example of the torn document placed on a document table.

FIG. 5 illustrates the two pieces 31, 32 placed on the document stage 19. Referring to FIG. 5, the pieces 31, 32 are originally a single rectangular document that has been torn in two. The pieces 31, 32 are placed anywhere with respect to the main scanning direction or sub-scan direction on the document stage 19. The piece 31 has a torn edge 31A, which is an edge created by tearing the document, and other edges 31B, 31C, 31D. The piece 32 also has a torn edge 32A, which is an edge created by tearing the document, and other edges 32B, 32C, 32D. The torn edges 31A, 32A have shapes other than a straight line when viewed from the front or back of the drawing sheet where the pieces 31, 32 are presented. Specifically, the torn edges 31A, 32A have the shapes of a sawtooth composed of a plurality of straight lines. The edges 31B, 31C, 31D, 32B, 32C, 32D are straight lines when viewed from the front or back of the drawing sheet where the pieces 31, 32 are presented.

Figure 6:
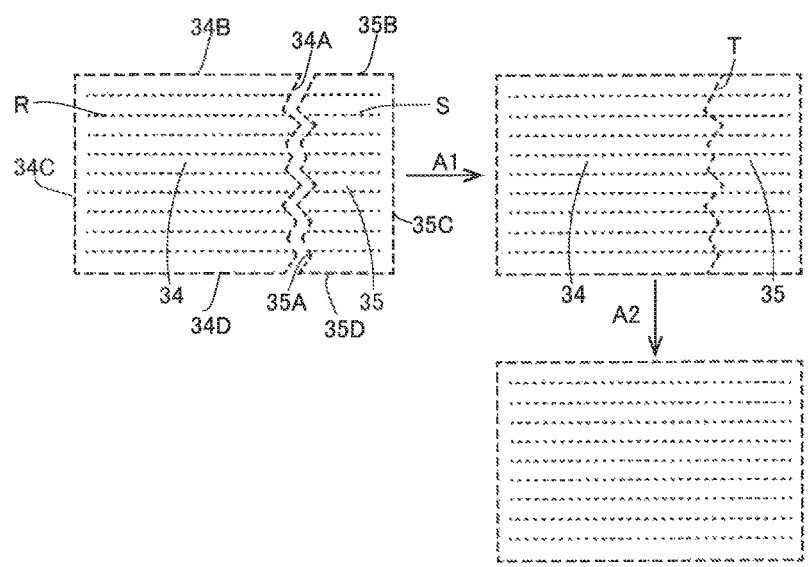
FIG. 6 illustrates an example process of combining images to produce a composite image.

Once the images on the pieces 31, 32 are captured, the images are processed to produce images (i.e., images 34, 35 in FIG. 6). The produced images are stored in the main storage memory 18 (S12). The first determination section 121 determines whether there are a plurality of images whose outer shapes are not rectangular in the images stored in the main storage memory 18 (S13). Referring to FIG. 5, the pieces 31, 32 have the torn edges 31A, 32A that have shapes other than a straight line when viewed from the front or back of the drawing sheet where the pieces 31, 32 are presented. This means that the outer shapes of the pieces 31, 32 are not rectangular, and as a result it can be said that the main storage memory 18 contains two images in total whose outer shapes are not rectangular.

If there are images whose outer shapes are not rectangular (YES in S13), the images are connected at the edges to combine the images (S14). FIG. 6 illustrates an example process of combining the two images 34, 35 to produce a composite image. Referring to FIG. 6, the image 34 is an image obtained by reading the piece 31, and includes character strings R. The image 35 is an image obtained by reading the piece 32, and includes character strings S. The image 34 has a torn edge 34A and edges 34B, 34C, 34D. The image 35 has a torn edge 35A and edges 35B, 35C, 35D. The torn edges 34A, 35A have shapes other than a straight line when viewed from the front or back of the drawing sheet. The edges 34B, 34C, 34D, 35B, 35C, 35D are straight lines when viewed from the front or back of the drawing sheet. Since the torn edges 34A, 35A have shapes other than a straight line, the torn edges 34A, 35A are connected to each other.

The second determination section 123 determines whether the outer shape of the combined image is rectangular (S15). Referring to FIG. 6, the combined image of the images 34, 35 with the torn edges 34A, 35A connected together now has the outer shape of a rectangle.

If the outer shape of the combined image is rectangular (YES in S15), the edges of the images are connected to produce a composite image (S16). The produced composite image is output (S17). Referring to FIG. 6, the images 34, 35 are connected at the edges to produce a composited image with a boundary T represented by a dotted line, and the composite image is formed on paper by the image forming unit 20 and output (A1). The boundary T can be deleted when the composite image is produced (A2).

The multifunction peripheral 11 as described above identifies the outer shape of images captured by the control unit 12, and connects the edges of the images. Then, if the outer shape of the combined image is in a specific shape, the multifunction peripheral 11 connects the edges of the images to automatically produce a composite image. The users do not need to provide an instruction to connect the images. Therefore, the multifunction peripheral 11 can reduce operational burdens on the users and also can provide a composite image that users require.

The images that are captured in S11 may be images transmitted from a computer (not shown) connected to a network through a network interface unit (not shown) in the multifunction peripheral 11.

The multifunction peripheral 11 can be configured to cause the display screen 21 of the display unit 13 to show the outer shape of the combined image and inquire of the user if she/he wants to produce and output its composite image in response to the determination result in S15 that the outer shape of the combined image is rectangular (YES in S15). If, in S15, it is not determined that the outer shape of the combined image is rectangular (NO in S15), the process is terminated without compositing the combined image.

The edges of the images to be connected in S14 may have the following shapes. If a plurality of images have edges with shapes including a non-straight line, the non-straight edges may be connected to each other. The non-straight line described herein means a line that is not a single straight line, but is composed of a plurality of lines. If a plurality of images have edges with shapes including a curve, the curved edges may be connected to each other. If a plurality of images have edges with shapes including an inclined line, the inclined edges may be connected to each other. The inclined line described herein means a line forming an angle other than 90 degrees with the neighboring edges. Defining the shapes as above can help reliably connect the edges of a torn document and produce an exact composite image.

Figure 7:
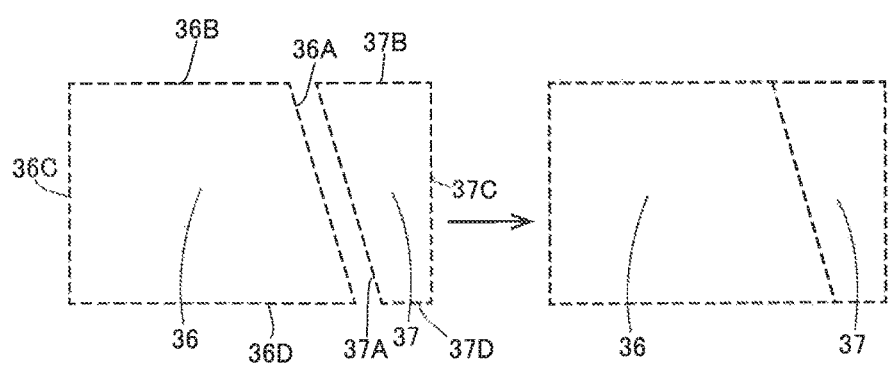
FIG. 7 illustrates another example process of combining images to produce a composite image.

FIG. 7 illustrates another example process of combining the two images 36, 37 to produce a composite image. The two images 36, 37 are captured from pieces of a rectangular document that is cut obliquely by a paper cutter. Referring to FIG. 7, the image 36 has a cut edge 36A and edges 36B, 36C, 36D. The image 37 has a cut edge 37A and edges 37B, 37C, 37D. The angle between the cut edge 36A and edge 36B is greater than 90 degrees. The angle between the cut edge 36A and edge 36D is less than 90 degrees. The angles between the edge 36C and edge 36B and between the edge 36C and edge 36D are 90 degrees. In addition, the angle between the cut edge 37A and edge 37B is less than 90 degrees. The angle between the cut edge 37A and edge 37D is greater than 90 degrees. The angles between the edge 37C and edge 37B and between the edge 37C and edge 37D are 90 degrees. The cut edges 36A, 37A are oblique lines when viewed from the front or back of the drawing sheet. This is why the cut edge 36A and cut edge 37A are connected to each other.

The process in S14 and 15 can be repeatedly performed to connect the edges of the images. Specifically, if the edges of images are connected to each other and the resultant combined image is not rectangular or is not bilaterally symmetric, the edges of the images are connected again differently to each other to combine the images.

In addition, the second determination section 123 can be configured to determine in S15 whether the outer shape of the combined image is a rectangle with a predetermined aspect ratio of a standardized paper size. The rectangle with a predetermined aspect ratio of a standardized paper size may have an aspect ratio corresponding to A4 format (210 mm×297 mm) or B5 format (182 mm×257 mm).

Alternatively, the second determination section 123 can be configured to determine in S15 whether the combined image is bilaterally symmetric with respect to a predetermined line passing through the center of the combined image. The bilaterally symmetric combined-image may be in the shape of, for example, an isosceles trapezoid.

In S17, the composite image can be formed by the image forming unit 20 on paper transported from a paper feed cassette 16, and then output. Alternatively, the composite image can be output by transmitting it to a computer (not shown) connected to the network. It is also possible to store the composite image in the hard disk 17 before outputting it.

In the case where the hard disk 17 contains composite images that have been already output, the second determination section 123 can be configured to determine in S15 whether the combination pattern of a combined image matches the combination pattern of a composite image stored in the hard disk 17. Accordingly, the second control section 124 can be configured to perform control operations to connect the edges of the combined image whose combination pattern matches that of a composite image stored in the hard disk 17 (YES in S15) to produce a composite image in S16. In addition, it is possible to output the composite image stored in the hard disk 17 in S16. This can promote the efficiency of image processing.

The control unit 12 may further include a first extraction section. The first extraction section extracts colors in regions near the connected edges of respective images making up a combined image. The regions near the connected edges mean regions that are, for example, a 1% or larger area of the combined image from the boundary connecting the images.

In S16, the second control section 124 can be configured not to produce a composite image when the colors extracted from the regions near the connected edges of the respective images making up the combined image are different from each other.

The control unit 12 may further include a second extraction section. The second extraction section extracts character strings in regions near the connected edges of respective images making up a combined image. The regions near the connected edges mean regions that are, for example, a 10% or larger area of the combined image from the boundary connecting the images.

In S16, the second control section 124 can be configured not to produce a composite image when character strings in a region near the connected edge extracted from one image are inclined with respect to character strings extracted from the other image. In this description, inclination of the character strings of one image to the other image is defined as that the angle between the character strings of one image and the character strings of the other image is, for example, less than 10 degrees. Referring to FIG. 6, the character strings R are not inclined to the character strings S, and the angle between the direction of the character strings R and the direction of the character strings S is 0 degree.

In S17, if the combined image includes a portion where there is no image, the part with no image may be replaced with some kind of supplemental image. In addition, if the combination pattern of the combined image matches the combination pattern of a composite image stored in the hard disk 17, the composite image may be output.

Although the capturing unit according to the above-described embodiment captures images of documents read by the reading unit 14, the present disclosure is not limited thereto, and the capturing unit can be configured to capture images by receiving the images transmitted from an external device, such as a computer (not shown) connected to a network through a network interface unit (not shown) of the multifunction peripheral 11. Alternatively, the capturing unit can be configured to capture images taken by an imaging unit of a smartphone, or other devices with an image taking function.

The image processing apparatus according to the present disclosure is applied to a multifunction peripheral in the above-described embodiments; however, the above-described configuration is not limited to multifunction peripherals, and can be applied to tablet devices, smartphones, digital cameras, and so on. Specifically, image processing apparatus can capture images of documents using the imaging unit of the tablet devices, smartphones, digital cameras and other devices that shoot documents.

In another aspect of the present disclosure, an image processing method includes the following configuration. The image processing method includes: a capturing step of capturing images of a plurality of documents; a storing step of storing the captured images of the documents; a first determining step of determining whether there are a plurality of images whose outer shapes are not rectangular in the stored images of the documents; a first controlling step of, if it is determined that there are images whose outer shapes are not rectangular, performing control operations to connect edges of the non-rectangular images to combine the non-rectangular images; a second determining step of determining whether the outer shape of the combined image, which is made up of the non-rectangular images combined by the first control section, is rectangular or whether the combined image is bilaterally symmetric with respect to a predetermined line passing through the center of the combined image; and a second controlling step of, if it is determined that the outer shape of the combined image is rectangular or that the combined image is bilaterally symmetric, performing control operations to produce a composite image of the non-rectangular images with the edges connected to each other. Thus, the image processing method can reduce operational burdens on the users and also can provide a composite image that users require.

It should be understood that the embodiment disclosed herein is illustrative and non-restrictive in every respect. The scope of the present disclosure is defined by the terms of the claims, rather than by the foregoing description, and is intended to include any modifications within the scope and meaning equivalent to the terms of the claims.

The image processing apparatus according to the present disclosure is effectively used especially to reduce operational burdens on users, and also to provide a composite image that users require.

What is claimed is:

1. An image processing apparatus comprising:
   a capturing unit that captures images of a plurality of documents;
   a storage unit that stores the images of the documents captured by the capturing unit;
   a first determination section that determines whether there are a plurality of images whose outer shapes are not rectangular in the images of the documents stored in the storage unit;
   a first control section that, if the first determination section determines that there are images whose outer shapes are not rectangular, performs control operations to connect edges of the non-rectangular images to combine the non-rectangular images;
   a second determination section that determines whether the outer shape of the combined image, which is made up of the non-rectangular images combined by the first control section, is rectangular or whether the combined image is bilaterally symmetric with respect to a predetermined line passing through the center of the combined image; and
   a second control section that, if the second determination section determines that the outer shape of the combined image is rectangular or that the combined image is bilaterally symmetric, performs control operations to produce a composite image of the non-rectangular images with the edges connected to each other.

2. The image processing apparatus according to claim 1, wherein
   if the images whose outer shapes are not rectangular have edges with shapes including a non-straight line, the non-straight edges are connected to each other.

3. The image processing apparatus according to claim 1, wherein
   if the images whose outer shapes are not rectangular have edges with shapes including a curve, the curved edges are connected to each other.

4. The image processing apparatus according to claim 1, wherein
   if the images whose outer shapes are not rectangular have edges with shapes including an inclined line, the inclined edges are connected to each other.

5. The image processing apparatus according to claim 1, wherein
   the first control section and the second determination section are controlled to repeatedly connect edges of the images to each other.

6. The image processing apparatus according to claim 1, wherein
   the second determination section determines whether the outer shape of the combined image is a rectangle with a predetermined aspect ratio of a standardized paper size.

7. The image processing apparatus according to claim 1, wherein
   the storage unit stores the composite image that has been already output,
   the second determination section determines whether a combination pattern of the combined image matches a combination pattern of the composite image stored in the storage unit, and
   if the second determination section determines that the combination pattern of the combined image matches the combination pattern of the composite image stored in the storage unit, the second control section performs control operations to connect the edges to produce a composite image.

8. The image processing apparatus according to claim 1, further comprising
   a first extraction section that extracts colors in regions near the connected edges of the respective images making up the combined image, wherein
   if the colors of the respective images extracted by the first extraction section are different from each other, the second control section performs control operations not to produce the composite image.

9. The image processing apparatus according to claim 1, further comprising
   a second extraction section that extracts character strings in regions near the connected edges of the respective images making up the combined image, wherein
   if the character strings of one of the images extracted by the second extraction section are inclined to the character strings of the other image, the second control section performs control operations not to produce the composite image.

10. The image processing apparatus according to claim 1, further comprising
    an image forming unit that forms an image on paper based on the composite image and outputs it.

11. An image processing method comprising the steps of:
    capturing images of a plurality of documents;
    storing the captured images of the documents;
    determining whether there are a plurality of images whose outer shapes are not rectangular in the stored images of the documents;
    if it is determined that there are images whose outer shapes are not rectangular, performing control operations to connect edges of the non-rectangular images to combine the non-rectangular images;
    determining whether the outer shape of the combined image, which is made up of the non-rectangular images combined by the first control section, is rectangular or whether the combined image is bilaterally symmetric with respect to a predetermined line passing through the center of the combined image; and
    if it is determined that the outer shape of the combined image is rectangular or that the combined image is bilaterally symmetric, performing control operations to produce a composite image of the non-rectangular images with the edges connected to each other.

* * * * *